US008590037B2

(12) United States Patent
Altay et al.

(10) Patent No.: US 8,590,037 B2
(45) Date of Patent: Nov. 19, 2013

(54) MANAGING HOST APPLICATION PRIVILEGES

(75) Inventors: Ahmet Altay, Mountain View, CA (US); Haluk Kent Tanik, Mountain View, CA (US); Robert Chin-Tse Chang, Danville, CA (US); Xian Jun Liu, San Jose, CA (US); Oktay Rasizade, Castro Valley, CA (US); Po Yuan, Milpitas, CA (US)

(73) Assignee: SanDisk Technologies Inc., Plano, TX (US)

( * ) Notice: Subject to any disclaimer, the term of this patent is extended or adjusted under 35 U.S.C. 154(b) by 1050 days.

(21) Appl. No.: 12/342,965

(22) Filed: Dec. 23, 2008

(65) Prior Publication Data

US 2010/0162370 A1    Jun. 24, 2010

(51) Int. Cl.
*H04L 29/06* (2006.01)

(52) U.S. Cl.
USPC ............. 726/18; 455/410; 455/411; 455/26.1

(58) Field of Classification Search
USPC .......................................................... 726/18
See application file for complete search history.

(56) References Cited

U.S. PATENT DOCUMENTS

| 5,963,915 | A  | * | 10/1999 | Kirsch | 705/26.8 |
| 6,735,441 | B1 | * | 5/2004 | Turgeon et al. | 455/433 |
| 7,024,556 | B1 | * | 4/2006 | Hadjinikitas et al. | 713/168 |
| 2002/0081994 | A1 | * | 6/2002 | Aoyagi | 455/411 |
| 2002/0108061 | A1 | * | 8/2002 | Harrison et al. | 713/201 |
| 2002/0116384 | A1 | * | 8/2002 | Laurila et al. | 707/10 |
| 2002/0184217 | A1 | * | 12/2002 | Bisbee et al. | 707/9 |
| 2003/0035409 | A1 | * | 2/2003 | Wang et al. | 370/349 |
| 2003/0037263 | A1 | * | 2/2003 | Kamat et al. | 713/202 |
| 2003/0149880 | A1 | * | 8/2003 | Shamsaasef et al. | 713/182 |
| 2004/0107368 | A1 | * | 6/2004 | Colvin | 713/202 |
| 2005/0071645 | A1 | * | 3/2005 | Girouard et al. | 713/183 |
| 2006/0089125 | A1 |   | 4/2006 | Frank |  |
| 2006/0089126 | A1 | * | 4/2006 | Frank et al. | 455/411 |
| 2006/0189298 | A1 | * | 8/2006 | Marcelli | 455/411 |
| 2007/0295799 | A1 | * | 12/2007 | Chibel et al. | 235/375 |
| 2008/0065905 | A1 | * | 3/2008 | Salessi | 713/193 |
| 2008/0201450 | A1 | * | 8/2008 | Bong et al. | 709/219 |

OTHER PUBLICATIONS

Chen et al., An Efficient Credential-Based Scheme for Cross-Domain File Sharing, Dec. 2007, 2007 International Conference on Computational Intelligence and Security, pp. 614-617.*
U.S. Appl. No. 11/967,641, entitled "Method and System for Creating and Accessing a Secure Storage Area in a Non-Volatile Memory Card", filed Dec. 31, 2007, 44 pages.

* cited by examiner

*Primary Examiner* — Taghi Arani
*Assistant Examiner* — Kenneth Chang
(74) *Attorney, Agent, or Firm* — Brinks Gilson & Lione

(57) ABSTRACT

A method and system of controlling access to a hardware or software feature provided by a host is disclosed. An application seeking authorization to access a feature transmits a credential and an index to a host agent within the host. The index is associated with the requested feature. The host agent reads credential validation data from a storage location corresponding to the index in a non-volatile storage device in communication with the host. The validity of the credential is determined based on the credential validation data, and an authorization is transmitted if the credential is valid. A third party can control the outcome of the validity determination by sending an instruction to the host to replace the credential validation data with invalid data that causes the validity test to fail. The third party can also control the non-volatile storage device data used by the application to calculate the credential.

20 Claims, 8 Drawing Sheets

MANAGING HOST APPLICATION PRIVILEGES

TECHNICAL FIELD

This application relates generally to the operation of non-volatile flash memory systems, and, more specifically, to a method for managing host application privileges.

BACKGROUND

The features and capabilities of cellular telephones and other handheld devices continue to improve. Until recently, cellular telephones were merely able to initiate and receive voice calls. Today, cellular telephones incorporate many different functions, such as sending and receiving Multimedia Messaging Service (MMS) or Short Message Service (SMS) transmissions ("text messages") to other cellular subscribers, playing music and video files, sending and receiving e-mail messages, taking pictures, recording video and audio, internet browsing, and incorporating the Personal Information Management (PIM) functions typically associated with a Personal Digital Assistant (PDA). Some cellular telephones also incorporate a removable media slot to store and access data on a removable media card using a communication interface such as a Multimedia Card (MMC) interface, a Secure Digital (SD) interface, a Universal Serial Bus (USB), or a Serial Advanced Technology Attachment (SATA) interface.

Mobile Network Operators (MNOs) that sell or provide these enhanced cellular telephones to their subscribers are faced with a variety of challenges. For example, an MNO may want to charge a monthly fee in order to use certain features of a telephone, such as a built-in camera. In this case, the MNO may charge a subscriber a fee in order to take pictures with the cellular telephone using a camera application (software or firmware) provided by the MNO that operates the camera. The MNO may want to enable or disable an application depending on whether a subscriber has paid for that service or feature. In doing so, the MNO may increase the monthly revenue received from an individual subscriber.

In another example, an MNO may want to allow third party software developers to write useful applications for the cellular telephone hardware used by the MNO's subscribers. If the cellular telephone hardware is "open platform" (or "open" to selected MNO vendors), third-party software developers may create applications that an MNO may not have the time or resources to develop on its own. If these applications increase the usefulness of the MNO's cellular telephone hardware, more users may subscribe to that MNO's network. However, the MNO may want to have ultimate control over whether a certain application is allowed to execute on its cellular telephone hardware, or access certain features of the hardware. Such control is desirable in the event that a software application contains a software virus that could damage the cellular telephone software or hardware or render it inoperable. This control is also desirable if a third-party application circumvents subscription features offered by the MNO, such as a software application that operates the cellular telephone camera hardware without requiring a subscription fee payable to the MNO.

SUMMARY

Therefore, it would be advantageous to have method or system where an MNO may have centralized control over the software applications that execute on hardware used to access the MNO's network. The centralized control may include the ability to grant privileges to a software application to access selected hardware or software features of a cellular telephone system. The centralized control may also include the ability to revoke one or more privileges previously granted to a software application.

In order to address these issues, a host agent in a cellular telephone may authenticate software applications and grant access to hardware or software features of a cellular telephone system. An MNO may assign a software application an input value that the software application can use to calculate a credential. The software application may present this credential to the host agent in order to authenticate itself to the host agent, and obtain authorization from the host agent to access a hardware or software feature. The input value assigned by the MNO may be stored in a predetermined location of a non-volatile memory accessible by the cellular telephone, such as an R-UIM card (for CDMA phones) or a SIM card (for GSM telephones) installed in the cellular telephone. The host agent may rely on an additional key value stored in the SIM card in order to complete the authorization. The software application and host agent may only have read-only access to this input value and additional key value, but the MNO has read and write access to the both values. To allow an authentication and authorization to succeed, the MNO may set a valid input value and host key value that allows the software application to calculate a correct credential, which, when supplied to the host agent, will successfully complete an authentication and authorization process. If the MNO wants to revoke a privilege, the MNO may replace the input value and/or the key value with an invalid value that will prevent the software application from calculating a valid credential, or that will prevent the host agent from verifying a credential as valid. In one embodiment, the input value and/or the key value may be replaced by overwriting the value with an invalid value. If an invalid credential calculated using the invalid input value is presented to the host agent, the host agent will not provide an authorization to access the requested hardware or software feature. Similarly, if the key value is changed to an invalid value, the host agent will not provide an authorization to access the requested hardware or software feature. Various embodiments are designed to address this need, examples of which are provided herein.

Specifically, an MNO may associate access to a hardware or software feature with an index value. If an application running on the host requires access to the hardware or software feature, the application may read an input value from a storage location in a non-volatile storage device that corresponds to the index value. The application may use this value to calculate a credential, possibly using additional keys or algorithms provided by the MNO and incorporated into the application. The application can send the credential and the corresponding index value to the host agent for evaluation.

The host agent, in turn, receives the index value and credential, and retrieves a key value corresponding to the index value from the non-volatile storage device. This key value can be used to calculate a result that is compared to an expected value corresponding to the index value. If the result matches the expected value, then an authorization is returned to the application. In another comparison scheme, the host agent reads an expected value from the non-volatile storage device. The host agent may apply a non-invertible function to the credential to yield a transformed credential, and determining if the transformed credential is equal to the expected value. In one embodiment, the authorization is a session identifier value that may be passed to an API to indicate that the application has permission to access a hardware or software feature through that API. The authorization may expire after a period of time, or after a number of uses of the feature, such as after a number function calls to the API.

A third party, such as a Mobile Network Operator, can revoke access to the hardware or software feature associated with an index by overwriting the input value or key value stored in the non-volatile storage device with a value that will cause the comparison performed by the host agent to fail. In one embodiment, the host agent receives the instruction from the MNO and overwrites the value associated with the index. In another embodiment, the MNO forms a secure communication channel with the non-volatile storage device and sends the instruction to the non-volatile storage device for execution. In one implementation, the host agent may receive and forward the instructions passed from the MNO to the non-volatile storage device through the secure channel.

A tiered authorization scheme can also be implemented utilizing the principles of the embodiments. In a tiered authorization scheme, multiple index values are associated with permission levels to access a hardware or software feature. A software application may calculate two or more credentials to gain access to a hardware or software feature, and the credentials are presented to a host agent. The host agent may provide an authorization from the host agent depending on the validity of the credentials presented. For example, if the application calculates two credentials to the host agent, the host agent may provide different authorizations depending on whether one credential, the other credential, or both credentials are valid. A tiered authorization scheme may be utilize to encode permission levels to access a hardware or software feature. For example, for access to a storage device, permission levels may include read-only access, write-only access, read/write access, or read/write/erase access.

Other embodiments and features and advantages thereof are possible and will be, or will become, apparent to one with skill in the art upon examination of the following detailed description and accompanying drawings. Hence, it is intended that the scope of the claimed invention as recited in the claims below will not be limited to the embodiments shown and described herein.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION OF THE PRESENTLY PREFERRED EMBODIMENTS

Figure 1:
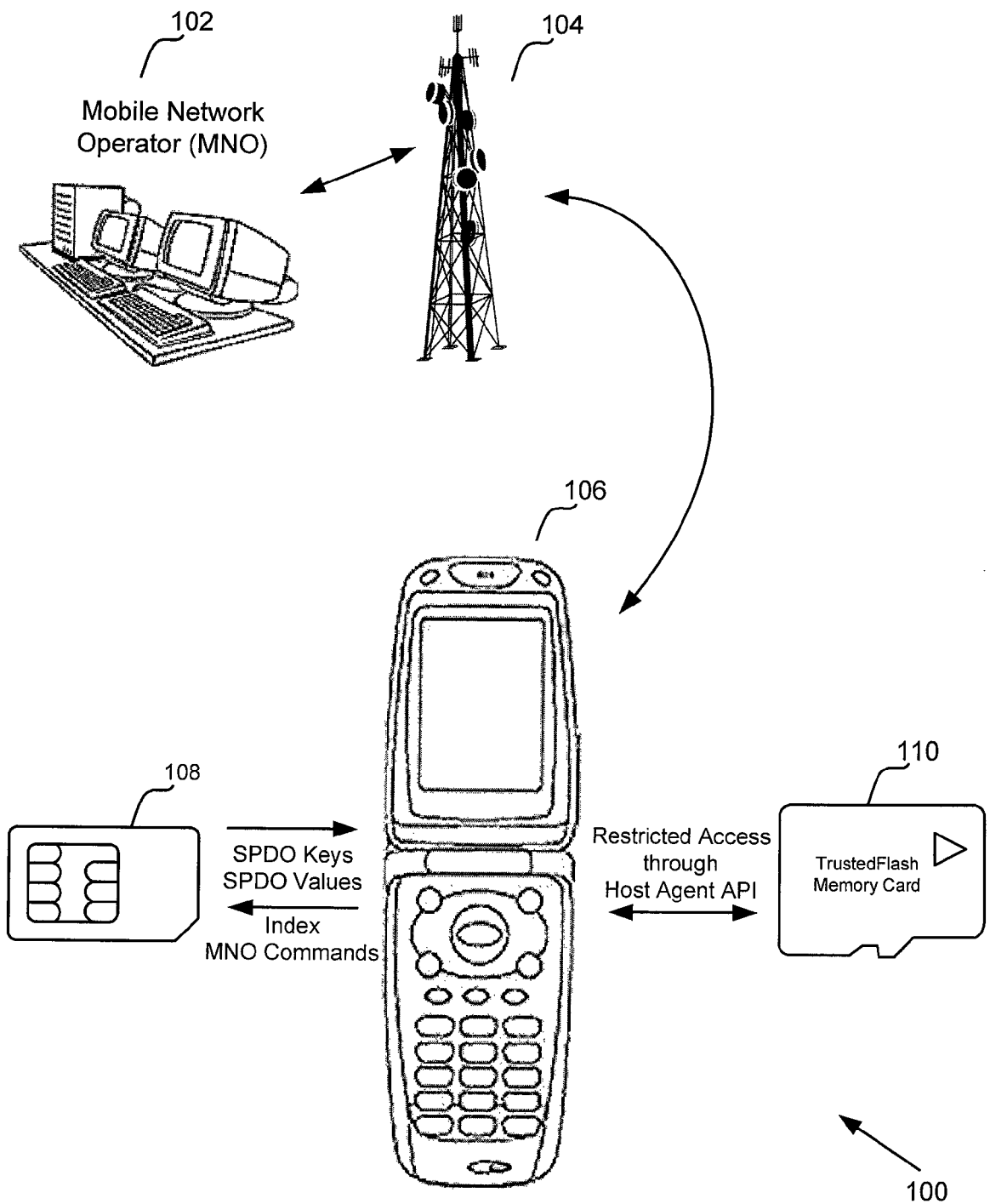
FIG. 1 is a diagram illustrating an exemplary system for controlling access to hardware and software features of a cellular telephone.

A cellular telephone used to access the network of a mobile network operator (MNO) may be capable of a variety of functions beyond simple voice communications. For example, cellular telephones may incorporate features of music and video players, personal digital assistants, navigation systems, cameras, and internet browsers. An MNO may provide a cellular telephone to a subscriber for free, or for a reduced price, in the hope of selling enhanced services to at least recoup the cost of the hardware. Additionally, the availability of applications for a cellular telephone may also attract subscribers. Thus, some MNOs may encourage third party software developers to create new and useful applications for the cellular telephone hardware used on the MNO's network.

An MNO may want to increase the revenue from each subscriber by enabling these enhanced hardware and software features for an additional monthly fee. An MNO may also want to have ultimate control over the third-party software applications that can be executed on cellular telephone hardware that may access its network. In one example, this MNO control may be used to prevent malicious software (such as viruses or spyware) from being installed or used on the cellular telephone hardware of its subscribers. In another example, the MNO may want to prevent the use of applications which circumvent the ability for an MNO to charge for a feature of the cellular telephone, such as use of a built-in camera.

The embodiments disclosed in the figures and accompanying description provide a host agent in a cellular telephone system that acts as a gatekeeper to selected software and hardware features. An entity, such as a user or software application, may access these features through the host agent only after authentication (proving their identity) and authorization (determining that the MNO has given the entity permission to do so). An MNO may assign a software application an input value and a key that, in combination, a may be used to calculate a credential. The software application may present this credential to the host agent in order to authenticate itself to the host agent, and obtain authorization from the host agent to access a hardware or software feature. The input value assigned by the MNO may be stored in an R-UIM card (for CDMA phones) or SIM card (for GSM telephones) installed in the cellular telephone. The host agent may rely on credential validation data, such as a host key, stored in the SIM or R-UIM card in order to verify the credential and complete the authorization.

The MNO controls the success of the authorization and authentication process by controlling the input value and credential validation data stored in the SIM card. For example, the MNO may allow an authentication and authorization to succeed by selecting valid input and host key values that allow the software application to calculate a valid credential, which, when supplied to the host agent, will successfully complete an authentication and authorization process. The MNO may force an authentication and authorization to fail by setting the input value to an invalid value that will prevent the software application from calculating a valid credential, or by setting the host key to a value that will cause a credential (valid or invalid) to be rejected. This is explained in further detail in the exemplary embodiments discussed in the foregoing figures and accompanying description.

FIG. 1 is a diagram illustrating an exemplary system 100 for controlling access to hardware and software features of a cellular telephone. The system 100 includes a Mobile Network Operator (MNO) 102, a plurality of cellular telephone antennas 104, a cellular telephone 106, a SIM (for Global System for Mobile communication networks) or an R-UIM (for Code Division Multiple Access networks) card 108, and a non-volatile memory card 110. An MNO 102 may transmit instructions to and receive and data from a cellular telephone 106 by transmitting commands, and transmitting and receiving data, through a network of antennas 104 in communication with a cellular telephone 106.

A cellular telephone 106 in communication with a mobile network such as Global System for Mobile communication (GSM) or Code Division Multiple Access (CDMA) networks, contains a SIM card or R-UIM card, respectively, that stores one more values that uniquely identify the subscriber or a subscriber's cellular telephone 106. Values that may identify a subscriber include an International Mobile Subscriber Identity (IMSI) value; another is a Mobile Subscriber Integrated Services Digital Network (MSISDN) value. Yet another value is the International Mobile Equipment Identity (IMEI) value, which uniquely identify GSM-capable cellular telephones.

The card 108, such as a SIM or R-UIM card, may also contain additional secure storage for other variables or parameters defined by the MNO 102. The MNO 102 can read or write to this storage, and configure this storage to allow read-only access to these variables by other entities, such as cellular telephone 106 software applications or hardware. In addition to providing secure non-volatile storage for parameters defined by the MNO 102, the SIM or R-UIM card 108 typically contains a microcontroller that executes programs (such as applets) that are also defined by the MNO 102 and stored within the SIM or R-UIM card 108.

Thus, the MNO 102 may uniquely identify an individual cellular telephone 106, and may transmit instructions and data to the cellular telephone 106. In one example, SIM Protected Data Objects (SPDOs) are specialized data values that an MNO 106 may store the SIM or R-UIM card 108. As will be explained in greater detail below, a software application running on the cellular telephone 106 may use an assigned SPDO value (input value) stored in the SIM or R-UIM card 108 to calculate a credential. This credential is presented to a host agent to gain authorization to access features of the cellular telephone 106. The host agent may use other assigned SPDO values to authenticate the identity of the software application, and determine if the credential authorizes the software application to access one or more features. For example, an authorized software application may have access to a host agent application programming interface (API) to store and access data on a non-volatile memory card 110, such as a TrustedFlash™ memory device from SanDisk Corporation of Milpitas, Calif. Because the MNO 102 may control the stored SPDO values available to the software application and host agent, the MNO 102 may control the success or failure of an authorization process using credentials calculated and verified using these SPDO values.

Figure 2:
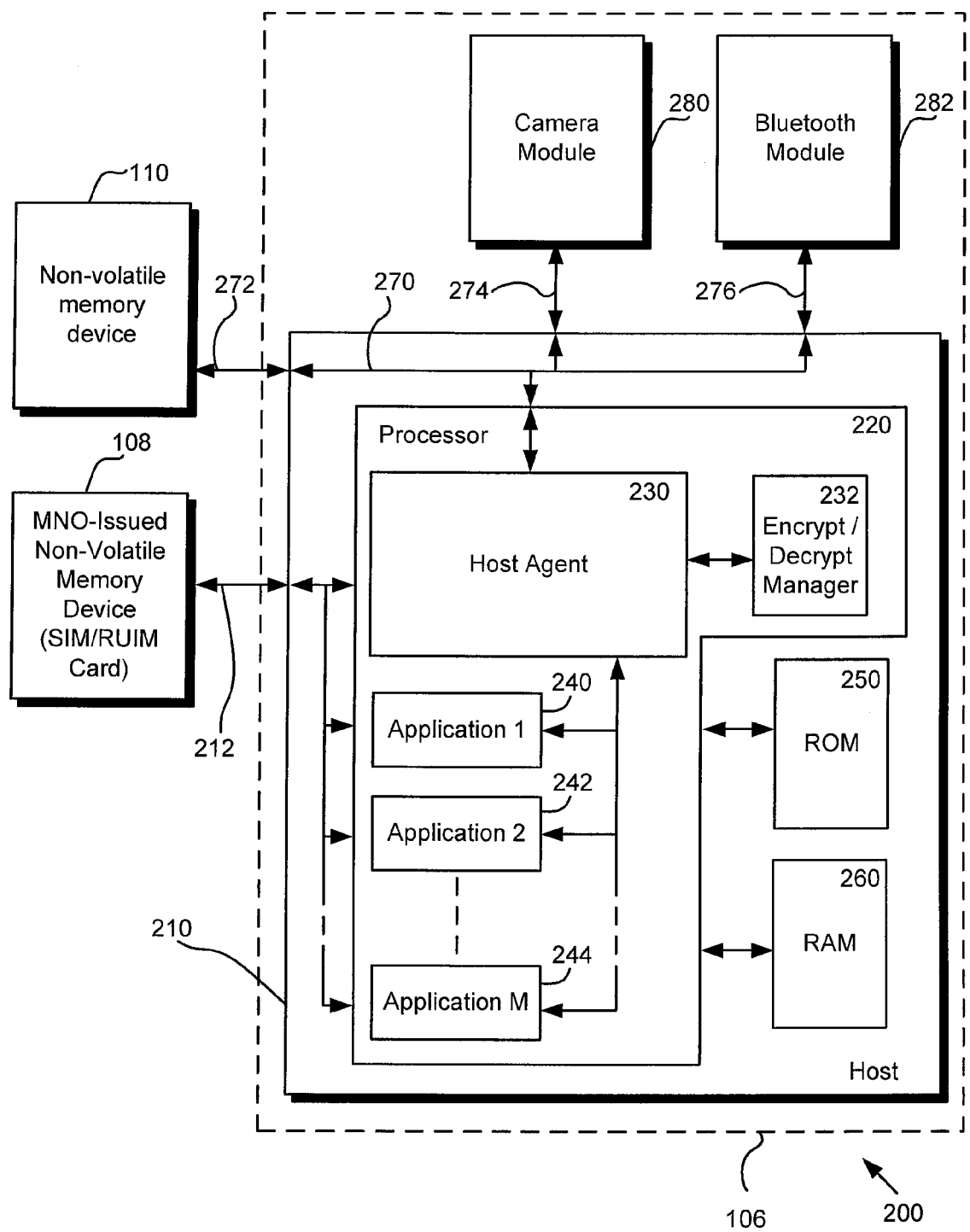
FIG. 2 is a diagram illustrating an exemplary cellular telephone system.

FIG. 2 is a diagram illustrating an exemplary cellular telephone system 200 in further detail. An exemplary cellular telephone system 200 comprises a cellular telephone 106, a SIM or R-UIM card 108, and a non-volatile memory device 110. The SIM or R-UIM card 108 may be installed in a receptacle or slot in the cellular telephone 106 that facilitates communication within the cellular telephone 106. In one embodiment, the SIM card 108 is a MegaSIM™ memory device from SanDisk Corporation of Milpitas, Calif. Similarly, the non-volatile memory device 110 may comprise a media card, such as a Secure Digital card, a MultiMediaCard device, or a TrustedFlash™ card, inserted in a slot or receptacle that facilitates communication with the cellular telephone 106. An exemplary cellular telephone 106 may include a host 210, a camera module, 280, and a Bluetooth module 282. A cellular telephone 106 may also incorporate additional elements, such as a keypad, display, microphone, speaker, and other components not shown in FIG. 2. The host 210 includes a processor 220, non-volatile memory 260, and Random Access Memory 250.

An example of a processor 220 is the OMAPV1035 GSM/GPRS/EDGE Integrated Single Chip cellular telephone platform from Texas Instruments Incorporated of Dallas, Tex. The processor 220 may be configured with processor executable instructions. The processor executable instructions may be stored in random access memory (RAM) 250 within the host 210, or non-volatile memory 260, such as a read-only memory (ROM), EEPROM (Electrically Erasable and Programmable Read Only Memory), or E-flash (embedded flash) within the host 210. The executable instructions that configure the processor 220 may implement a number of software modules or applications that communicate with one another and with hardware and software inside and outside of the host 210, in order to implement the functions of a cellular telephone 106. These software modules may include a host agent 230, an encryption/decryption engine manager 232, and a plurality of software applications 240, 242, and 244.

A host agent 230 may be part of the processor executable instructions that comprise an operating system (OS) for the processor 220, where the OS coordinates and implements all of the basic functions of the cellular telephone 106 defined by the MNO 102, including configuring, controlling, and accessing the hardware within the cellular telephone 106. In another embodiment, the host agent 230 is a software module independent of the OS, and has permission to configure, control, and access all of the hardware and software components within or in communication with the cellular telephone 106. The processor executable instructions that make up the host agent 230 may be defined by the MNO 102. Other software modules may perform specialized functions. For example, an encryption decryption engine manager 232 may organize encryption/decryption keys, and may implement encryption/decryption algorithms.

Software applications 240, 242, and 244 are also part of the instructions executed on the processor 220. The software applications 240, 240, and 244 may be written by the MNO 102 or by a third-party software vendor. The host agent 230 and the software applications 240, 240, and 244 may have equivalent privileges to access some of the hardware or software resources within the system. For example, as illustrated in FIG. 2, the host agent 230 and the software applications 240, 240, and 244 may have direct access to the non-volatile memory 260, the Random Access Memory 250 within the host 210, or the SIM or R-UIM card 108 in communication with the cellular telephone 106 over an interface 212.

Generally, however, software applications 240, 242, and 244 are less capable than the host agent 230, as illustrated in FIG. 2, because the software applications have fewer permissions to directly access, configure, and control hardware and software features or components within or in communication with the cellular telephone 106. For example, the host agent 230 may access a camera module 280 through a communication interface 274 available only to the host agent 230. Similarly, the host agent 230 can access the Bluetooth module 282, and the non-volatile memory device 110 through communication interfaces 276 and 274 available only to the host agent 230. Similarly, the host agent 230 may have access to the encryption/decryption engine manager 232 or other software modules through a separate interface available only to the host agent 230.

In contrast, the software applications 240, 242, and 244 may not have direct access to the non-volatile memory device 110, the camera module 280, and the Bluetooth module 282. Similarly, the software applications 240, 242, and 244 may not have direct access to the functionality provided by the encryption/decryption engine manager 232 or other software modules. In one embodiment, the software application 240, 242, and 244 may only access one or more of these hardware resources 110, 280, and 282, or software resources 232, through one or more application programming interfaces (APIs) provided by the host agent 230. However, the host agent 230 will only provide access to one of its APIs if the software application is authenticated, and if the software application is authorized to access that software module or feature. Exemplary embodiments for authentication and authorization processes are detailed further in the figures and accompanying text below.

Figure 3:
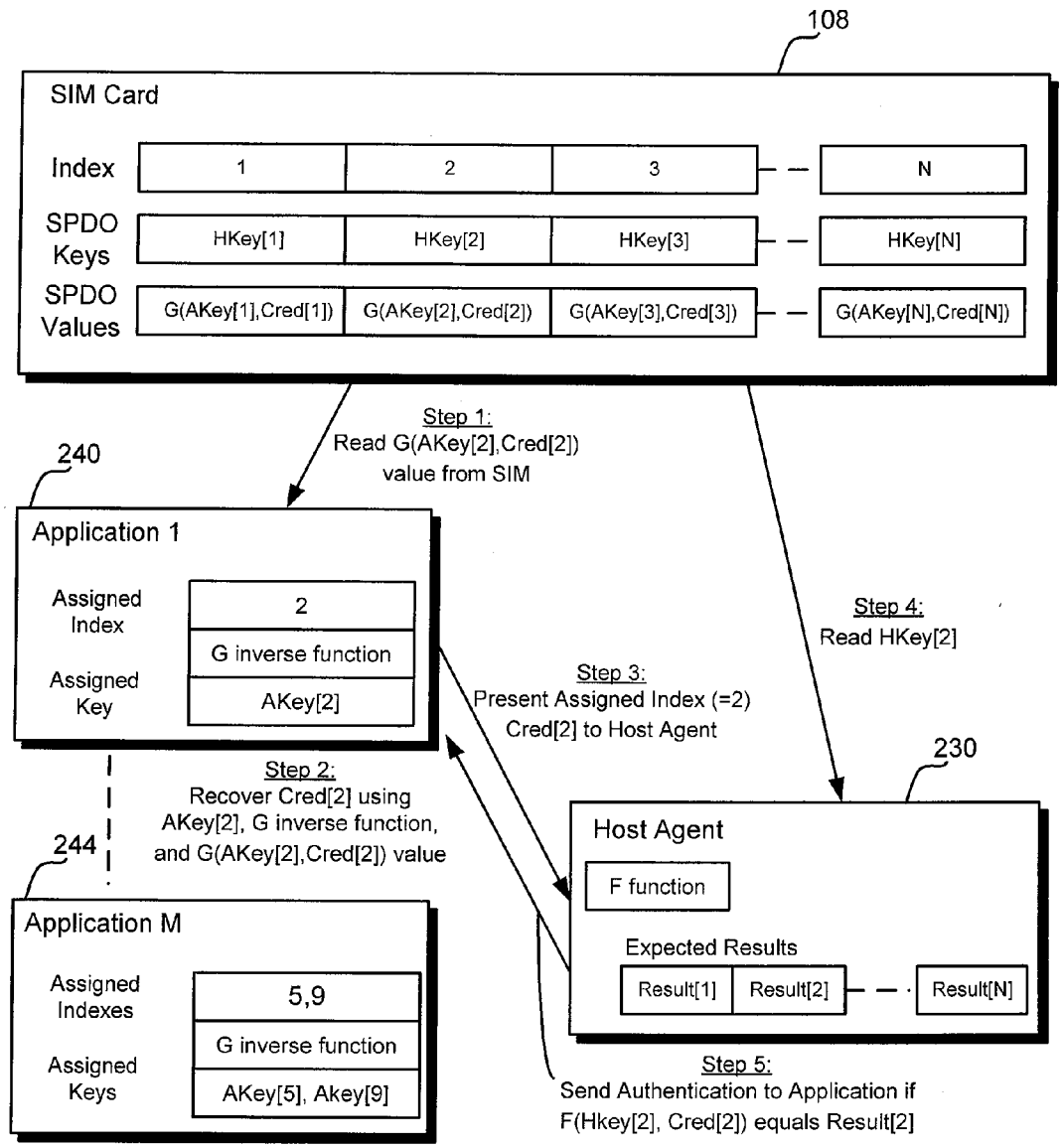
FIG. 3 shows an exemplary flow of data and variables when authenticating and authorizing a software application to access a hardware or software feature in a cellular telephone system.

FIG. 3 shows an exemplary flow of data and variables when authenticating and authorizing a software application 240, 242, 244 to access a hardware or software feature in a cellular telephone system 200. The Mobile Network Operator (MNO) 102 may provide a number of functions and variables that may be used in the authentication and authorization process, as shown in the table below.

TABLE 1

| Variable/Function | Description |
|---|---|
| AKey[i] | Indexed key assigned to an application |
| Cred[i] | Indexed credential assigned to an application |
| G | Public function applied to Cred[i] before storage in the SIM Card. Function uses AKey[i] input when applied to Cred[i]. |
| G-inverse function | Public function applied used to recover Cred[i] from value stored in the SIM Card. Function uses AKey[i] input. |
| HKey[i] | Indexed key used by the host agent |
| F | Public function applied to Cred[i] before comparison with result. Function uses HKey[i] input when applied to Cred[i]. |
| Result[i] | Indexed expected result used by the host agent |

The MNO 102 stores two sets of SIM Protected Data Objects (SPDOs) in the SIM Card 108 for use during the authentication and authorization process. The first set is referred to as SPDO values. Each SPDO value is the output of a public function G applied to a corresponding credential (Cred[i]), using a corresponding application key (AKey[i]).

$$SPDO[i]=G(AKey[i],Cred[i])$$

The SPDO value is the input value used by the software application to calculate (recover) the credential (Cred[i]). The function G is any invertible function. For example, if function G inverted each of the bits in a binary representation of a value X, then the inverse function (denoted as $G^{-1}$) would also invert each bit, so that the original value X can be recovered:

$$G^{-1}(G(X))=X$$

The value AKey[i] is an input that is used by invertible function G. In this case, the value X can be recovered from invertible function that accepts an additional input (k) as follows:

$$G^{-1}(k,G(k,X))=X$$

In one embodiment, function G is a symmetric-key encryption function such as Advanced Encryption Standard (AES) or Triple Data Encryption Standard (TDES or 3DES), where the application key is used to encrypt the credential. Thus, the SPDO value stored is an encrypted credential. The corresponding inverse of function G is a symmetric key decryption function that uses the same application key.

$$G^{-1}(AKey[i],SPDO[i])=G^{-1}(AKey[i],G(AKey[i],Cred[i]))=Cred[i]$$

The MNO 102 may assign an application index i and a corresponding application key AKey[i] to a software application. The MNO 102 also provides the inverse of function G ($G^{-1}$) to the software application 240, 242, 244 to allow the recovery of Cred[i].

The second set of SIM Protected Data Objects (SPDOs) stored in the SIM Card 108 is the SPDO key set. The ith SPDO key, HKey[i], may be used by the host agent 230 to verify the ith credential presented to it, Cred[i], using the following equivalence test:

$$Result[i]=F(HKey[i],Cred[i])$$

The MNO 102 provides the set of expected result values Result[1:N] and the function F to the host agent 230. In one embodiment, the set of expected result values are compiled into the executable instructions that make up the host agent 230. In another embodiment, the expected results are in a table stored in the non-volatile memory 250 or elsewhere in the host 210, and are available only to the host agent 230. In one embodiment, function F is an encryption function such as Advanced Encryption Standard (AES) or Triple Data Encryption Standard (TDES or 3DES), and HKey[i] is the host encryption or decryption key used by the function F when performing the encryption of decryption operation. If function F is not an encryption or decryption function, HKey[i] acts as another input value to function F.

The MNO 102 assigns a software application 240 an index value i, an application key AKey[i]. In one embodiment, the index value i and corresponding application key AKey[i] are only assigned to one software application 240, and may not be re-used for other software applications. For one software application, such as Application 1 in FIG. 3, the MNO 102 assigns index i=2, and an application key AKey[2]. The MNO 102 also provides the software application the inverse of function G. This function may be shared among several applications 240, 244. The assigned index value, application key, and inverse of function G may be compiled into the executable instructions of the software application 240.

Referring to FIG. 3, the software application 240 is authenticated by the host agent 230 and receives an authorization from the host agent 230 in several steps. The software application 240 reads its assigned SPDO value, SPDO[2], from the SIM card 108. In order to do this, the software application 240 may need to present its assigned index to the SIM card 108, and the SPDO value returned corresponds to the assigned index. The assigned SPDO value returned by the SIM card 108, SPDO[2], is the output of function G applied to the credential Cred[2], using application key AKey[2]. The software application 240 then applies the "G inverse" function to SPDO value, using its assigned application key AKey[2] in order to recover its assigned credential Cred[2].

The software application 240 then presents its assigned index value, and the credential Cred[2], to the host agent 230. The host agent 230 reads an SPDO Key from the SIM Card 108. The retrieved SPDO Key, HKey[2], corresponds to the assigned index value i=2 presented by the software application 240. The host agent 230 then applies function F to the credential, using the SPDO Key, and the output is compared to the expected result values set entry Result[1:N] corresponding to the index value provided by the software application 240:

$$Result[2]=F(HKey[2],Cred[2])$$

If the comparison succeeds, the host agent 230 has authenticated the identity of the software application 240, and provides an authorization to the application 240 to use the requested feature. In one embodiment, the authorization may be a session identification value. When the software application 240 needs to access that hardware or software module or feature, such as through an API of the host agent 230, the software application 240 may provide the session identification value instead of repeating the authorization process outlined above. In one embodiment, the session identification value may expire after a period of time, or a number of uses of the hardware or software module or feature, such as through host agent 230 API. If the session identification value is expired, the authentication and authorization process may be repeated in order to obtain a new authorization and new session identification value.

For a given index i, the MNO sets values of the expected result Result[i], the credential Cred[i], the application key AKey[i], the host key HKey[i], and the SPDO value SPDO[i] (in other words, G(AKey[i], Cred[i])) so that the following equations are satisfied:

$$Result[i]=F(HKey[i],Cred[i])$$

$$Result[i]=F(HKey[i],G^{-1}(AKey[i],SPDO[i]))$$

$$Result[i]=F(HKey[i],G^{-1}(AKey[i],G(AKey[i],Cred[i])))$$

The values of HKey[i] and SPDO[i] are stored by the MNO 102 in the SIM Card 108. Inspection of the equations above reveals that the MNO may cause this comparison to fail by changing the value of HKey[i], SPDO[i], or both, from a valid value (that allows the equivalence comparison to succeed) to an invalid value (that causes the equivalence comparison to fail). Thus, the software application 240, 244 assigned to index i will not be authenticated, and will not receive an authorization, if the MNO 102 sets values of HKey[i] and SPDO[i] so as to cause the comparison test performed by the host agent 230 to fail.

In one embodiment, a session identification value assigned to an authorized software application 240 can expire, such as after the passage of time or after a number of uses of the host agent 230 API. In this embodiment, the software application 230 may repeat the authorization process once the session identification value is expired in order to be re-authenticated and re-authorized. The MNO 102 may revoke an authorization of a previously authenticated and authorized application by setting values of HKey[i] and/or SPDO[i] that cause the comparison equations to fail when a subsequent authentication and authorization is performed. For example, if a session identification value for the software application 240 expires every five minutes, the MNO 102 may revoke an authorization to the application 240 by changing the assigned SPDO value (SPDO[2]) and/or the corresponding SPDO key (HKey[2]) stored in the SIM Card 108. Within the next five minutes, the next authentication and authorization attempt by the software application 240 will fail.

A rogue application 240 may attempt to circumvent the revocation by storing a previously calculated valid credential Cred[i], then presenting this value to the host agent 230 instead of a new credential value periodically recalculated from the SPDO[i] value read from the SIM card 108. For this reason, changing the value of SPDO[i] alone may be a less effective method of revoking an authorization. By changing HKey[i] as well, the MNO 102 may prevent an application 240 from merely presenting a previously calculated Cred[i] to renew an authorization after the MNO 102 has revoked privileges to that application 240.

Inspection of the comparison equations also reveals how the identity of the software application 240 is authenticated through this process. The software application 240 may have exclusive access to application key 2, AKey[2], provided by the MNO 102 to the author of the software application 240. Another software application may not successfully complete the result comparison equation without the correct value of AKey[2], as evident from the comparison equations:

$$Result[2]=F(HKey[2],Cred[2])$$

$$Result[2]=F(HKey[2],G^{-1}(AKey[2],SPDO[2]))$$

A software application that presents the correct credential Cred[2] must also be the software application that is assigned (or that has knowledge of) the corresponding application key AKey[2] and index i=2 by the MNO. Thus, the process may also be utilized to authenticate the identity of the software application 240.

The process may also be utilized to provide a variety of authorizations to the software application 240. Referring briefly to FIG. 2, the authorization may provide the software application 240 access to one or more host agent API's to configure, control, or access one or more hardware of software resources within the system 200. For example, the software application 240 may be a program to take pictures using the camera module 280. The software application 240 may seek authorization to use the following API provided by the host agent 230 to operate the camera module 280:

```
TakePicture(int SessionID, FILE* image);
EnableFlash(int SessionID);
DisableFlash(int SessionID);
```

Once authorized, the software application 240 may use the host agent 230 API, and the session identifier provided by the host agent 230, to take a photograph using the camera module 280 by calling functions provided through the host agent camera API. The host agent 230 may verify that the session identifier provided in the function call corresponds to the software application 240 currently authorized to use the camera API. The same authorization may also allow the software application 240 to store the photograph in the non-volatile memory card 110 using another API provided by the host agent 230.

In another embodiment, the MNO 102 may assign two or more index values and application keys to an application. For example, software application #M 244 in FIG. 3 is assigned index values 5 and 9, and corresponding keys AKey[5] and AKey[9], and may use SPDO values SPDO[5] and SPDO[9] for authentication and authorization processes. Similarly, the host agent 230 may utilize SPDO keys HKey[5] and HKey[9], and expected result values Result[5] and Result[9] to authenticate and authorize software application #M 244 for one or more purposes. Thus, the software application #M 244 may complete the authorization process for assigned index value 5, and may complete a separate authorization process for assigned index value 9.

By assigning more than one index values to the software application, the MNO 102 may implement a variety of privilege control schemes. In one embodiment, an application is assigned an index value for each hardware or software resource in the cellular telephone system 200. For example, referring to FIG. 2, assigned index value 5 may be used to control access to the camera module 280 by software application #M 244, and assigned index value 9 may be used to control access to the Bluetooth module 282 by software application #M 244.

In another embodiment, the MNO 102 may create a tiered authorization scheme by assigning two or more indexes to encode permission or privilege levels, for example, to access the non-volatile memory 110 using the API from the host agent 230, as shown in the table below.

TABLE 2

| Privilege Level | Assigned Index 5 Privilege | Assigned Index 9 Privilege | Description |
| --- | --- | --- | --- |
| 1 | Revoked | Revoked | No read or write privileges to non-volatile memory |
| 2 | Revoked | Authorization Possible | Read-only access to non-volatile memory if currently authorized through index 9 |
| 3 | Authorization Possible | Revoked | Write and Read access to non-volatile memory if currently authorized through index 5 |
| 4 | Authorization Possible | Authorization Possible | Write, Read, and Erase access to non-volatile memory if currently authorized through index 5 and index 9 |

Referring to Table 2, in the first privilege level or tier, the MNO 102 revokes privileges or authorizations obtainable using assigned indexes 5 and 9. The software application #M 244 will be blocked from receiving the authorization necessary to read and write to the non-volatile memory 110. In the second privilege level or tier, the MNO 102 revokes privileges obtainable using assigned index 5, but allows the software application #M 244 to succeed if authorizing through index 9. Thus, the software application #M 244 may obtain read-only access to the non-volatile memory 110 by completing the authentication and authorization process using assigned index 9.

In the third privilege level or tier, the MNO 102 revokes privileges obtainable using assigned index 9, but allows the software application #M 244 to succeed if authorizing through index 5. Therefore, the software application #M 244 may obtain read and write access to the non-volatile memory 110 by completing the authentication and authorization process using assigned index 5. In the fourth privilege level or tier, the MNO 102 allows the software application #M 244 to succeed if authorizing through both indexes 5 and 9. Therefore, the software application #M 244 may obtain read, write, and erase privileges to the non-volatile memory 110 by completing the authentication and authorization process using both assigned indexes 5 and 9. In this embodiment, the host agent 230 may track each assigned index that is currently authenticated and authorized, and provide access to the host agent API for the non-volatile memory based on the privilege level. Generally, the MNO 102 must configure the host agent 230 to have knowledge of the privileges afforded by successful authentication and authorization to each index [1:N], or index combination. This configuration may occur either at the time the host agent 230 is compiled, or after the host agent is compiled by dynamically configuring a host agent 230 before or after the cellular telephone 106 is provided to a subscriber.

In an alternative embodiment, an MNO 102 may also implement the privilege access scheme utilizing four assigned indexes instead of encoding four permission levels or tiers using two assigned indexes. The chosen implementation may depend on the hardware and software resource constraints of the system 200. For example, more storage space in the SIM card 108 may be required to store additional SPDO values and SPDO keys for an implementation without encoding. On the other hand, the decoding logic or instructions within the host agent 230 for an encoded solution may be more complex.

Figure 4:
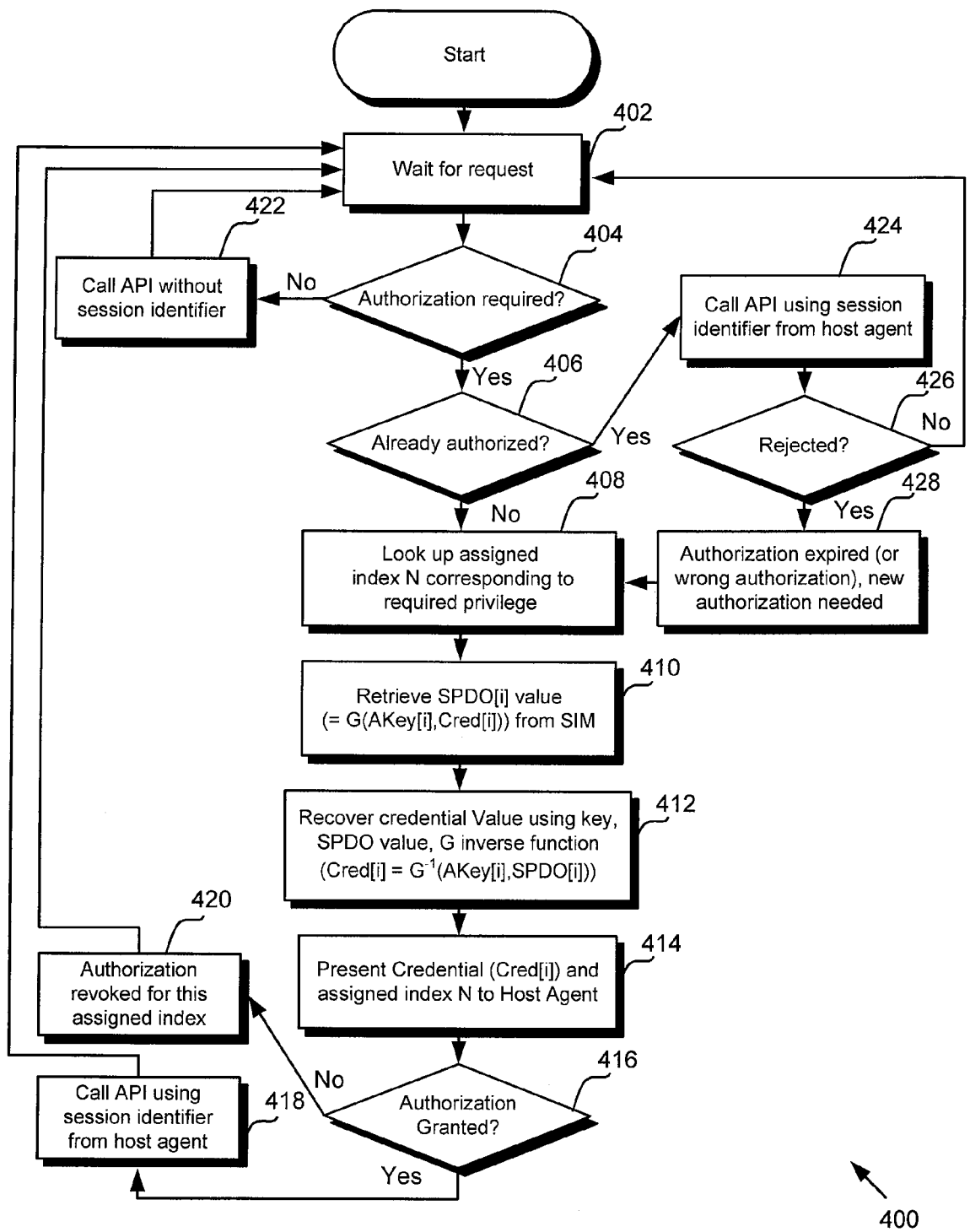
FIG. 4 shows exemplary steps for a software application to access a hardware or software feature in a cellular telephone system.

FIG. 4 shows exemplary steps 400 for a software application to access a hardware or software feature in a cellular telephone system 200. The exemplary steps 400 are from the perspective of the software application 240, 244 that seeks to access a hardware or software feature in a cellular telephone system 200.

Control begins at step 402, where a software application 240, 244 receives a request to access a hardware or software feature in a cellular telephone system 200. The request may be generated internally within the software application 240, 244, or the request may originate from an external input, such as from another software application, or from an input received from a user of the cellular telephone 106, such as through a cellular telephone keypad or other input device. Control passes to step 404, where the software application 240, 244 determines if an authorization is required in order to access the hardware or software feature in the cellular telephone system 200. As previously noted, some features may not require authorization, such as reading data from the non-volatile memory 250 or RAM 260. If authorization is not required, control passes to step 422, where the appropriate API function is called without a session identifier assigned to an authenticated and authorized entity, and control returns to step 402 to wait for another request.

In order to access some features, such as accessing a camera module 280, or the non-volatile memory 110, the software application 240, 244 must be authenticated and authorized. In this case, control passes from step 404 to 406, where the software application determines whether it has already been authenticated and authorized to access this feature. In one embodiment, the software application 240, 244 may maintain a list of session identification values issued by the host agent 230. These session identification values were previously issued in response to a successful completion of one or more authorization processes for one or more assigned index values. If an existing assigned session identifier corresponds to the requested hardware or software feature in a cellular telephone system 200, control then passes from step 406 to step 424, where the software application 240, 244 calls a function in the appropriate host agent API corresponding to the requested hardware or software feature. The session identification value may be presented as part of the function call, such as an argument to the function call. At step 426, the host agent 230 evaluates the session identification value to determine if it provides the necessary authorization for the requested feature, and if it is still valid (not expired). If the request is not rejected, the function call succeeds, and control returns to step 402 to wait for another request.

If the host agent API function rejects the function call, control passes to step 428, where the host agent API function may inform the software application 240, 244 that the session identification value provided with the function call corresponds to an expired authorization, or an authorization that does not provide the requisite permission to access the requested function. In this case, the software application 428 may seek a new authorization to access the requested hardware or software feature, and control thus passes to 408 in order to do so.

Returning to step 406, the software application 240, 244 may determine that it is not currently authorized (or was never previously authorized) to access the requested hardware or software feature. Control then passes to step 408, where the software application 240, 244 determines the index i corresponding to the requested feature. The index i value for a given hardware or software feature is established by the MNO 102 and provided to the author of the software application 240, 244, so that it may be encoded into the executable instructions of the software application. The software application 240, 244 then retrieves the SPDO value corresponding to index i, also referred to as SPDO[i], from the SIM card 108. As discussed in FIG. 3 and the accompanying text, SPDO[i] is the output of applying function G with an application key i to a credential.

$$SPDO[i] = G(AKey[i], Cred[i])$$

Control passes to step 412, where the credential value, Cred[i], is recovered from the SPDO value read from the SIM card 108, by applying the inverse of function G and using the application key, AKey[i], assigned by the MNO:

$$G^{-1}(AKey[i], SPDO[i]) = Cred[i]$$

Control then passes to step 414, where the software application 240, 244 presents the assigned index i, and the recovered credential Cred[i] to the host agent 230 for verification. If the authentication is successful and the authorization is granted, then the host agent 230 provides a session identifier to the software application 240, 244, and the software application 240, 244 calls the function in the appropriate host agent API corresponding to the requested hardware or software feature. The session identifier value is passed to the host agent 230 as part of the function call as a credential that identifies the software application 240, 244 and indicates a permission to access the requested hardware or software feature. After the function call completes, control returns to step 402 to wait for another request.

If the authorization is not granted, control passes to step 420, where the host agent 230 may inform the software application 240, 244 that the MNO 102 has revoked or disabled privileges associated with assigned index i. Thus, a session identification value is not provided by the host agent 230 to the software application 240, 244. In another embodiment, the host agent 230 may not provide any further information to the software application 230, beyond rejecting the authentication and authorization request. Thus, the request to access the desired hardware or software fails, and control returns to step 402 to wait for another request.

Figure 5:
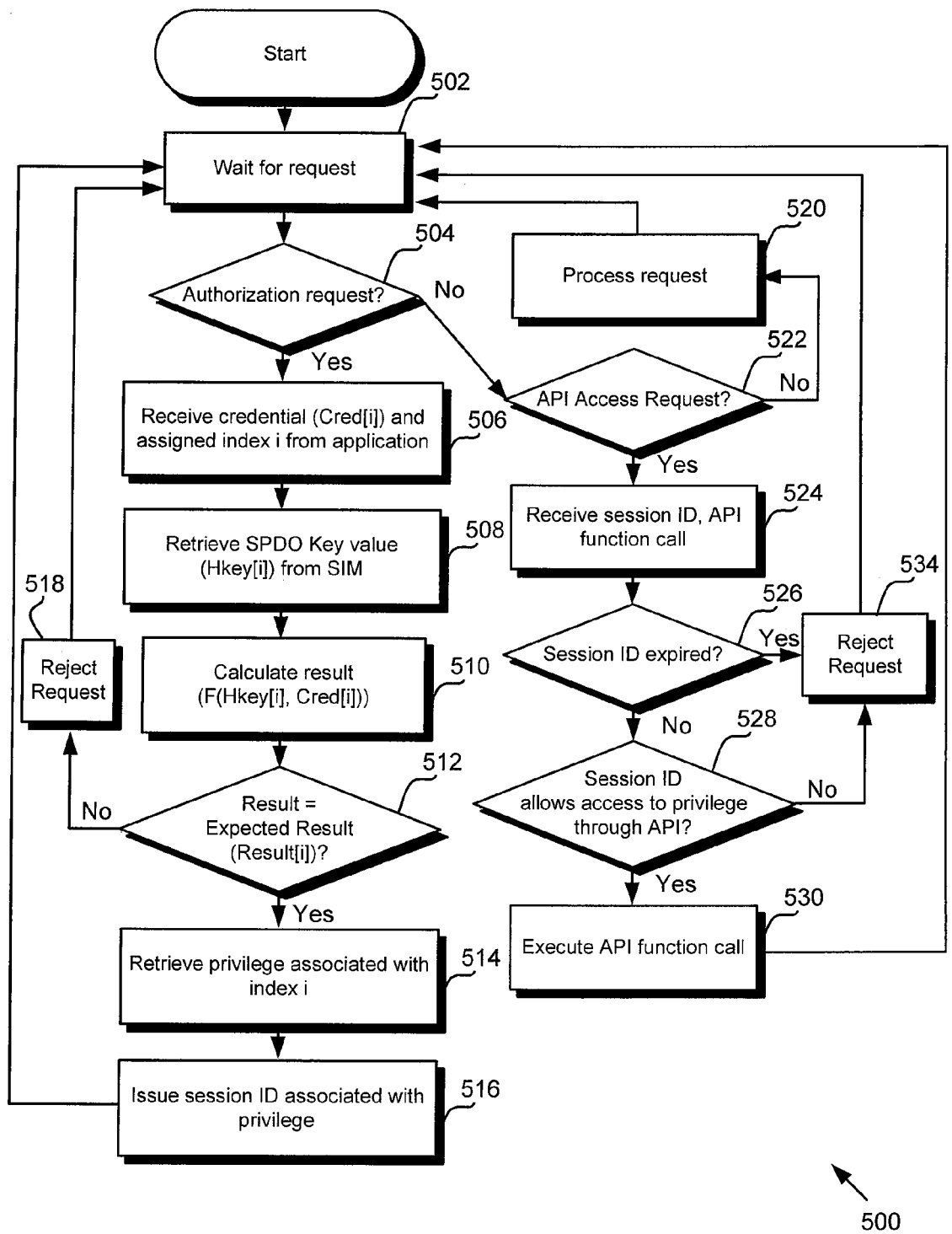
FIG. 5 shows exemplary steps for authenticating and authorizing a software application to access a hardware or software feature in a cellular telephone system.

FIG. 5 shows exemplary steps 500 for authenticating and authorizing a software application to access a hardware or software feature in a cellular telephone system. The exemplary steps 500 are from the perspective of the host agent 230 that processes a request from the software application 240, 244 to access a hardware or software feature in a cellular telephone system 200. Control begins at step 502, where the host agent 230 receives a request from the software application 240, 244. In one embodiment, an entity such as a software application may request to be authenticated and authorized to access a hardware or software feature in a cellular telephone system 200. An entity may also request access to a hardware or software feature through an API provided by the host agent 230. In step 504, the host agent determines the type of request that was received.

If the software application 240, 244 requests authorization to access a host agent 230 API for a particular function, control passes from step 504 to step 506. In step 506, the host agent 230 receives a credential, and the assigned index i associated with the requested hardware or software feature. Control passes to step 508, where the host agent 230 reads the SPDO key value associated with assigned index i, HKey[i], from the SIM card 108. In step 510, the host agent 230 applies function F to the credential Cred[i], using the SPDO key HKey[i] as an additional input to the function. In one embodiment, function F is an encryption function, and the credential Cred[i] is encrypted with using the SPDO key HKey[i]. In another embodiment, function F is a decryption function, and the credential Cred[i] is decrypted with using the SPDO key HKey[i]. Control passes to step 512, where the result of applying function F to the credential Cred[i], using the SPDO key HKey[i], F(HKey[i], Cred[i]), is compared with the expected result associated with the assigned index i, Result[i].

If the comparison fails, then the authentication and authorization attempt is unsuccessful, the request is rejected in step 518, and control returns to step 502 to wait for another request. In step 518, the host agent 230 may optionally provide a reason for rejecting the request. If the comparison succeeds, then the host agent 230 determines the hardware or software access privileges associated with assigned index i in step 514. Control passes to step 516, where these privileges are associated with a session identifier value issued to the software application 240, 244. By providing a session identifier, the host agent 230 indicates to the software application 240, 244, that its identity has been authenticated, and it is authorized to access hardware or software features in the cellular telephone system 200 defined by the MNO 102 and associated with assigned index i. The software application may utilize the issued session identifier value in subsequent requests to use a host agent API to access a hardware or software feature permitted by that privilege.

As stated above, the host agent 230 may receive authentication and authorization requests, and may also receive requests to use an authorization to access a host agent API. Returning to step 504, if the request is not an authentication and authorization request, then control passes to step 522, where the host determines if the host agent 230 has received a request to access a hardware or software feature through an API provided by the host agent 230. If not, some other type of request has been received, and control passes to step 520, where the host agent 230 processes the request, and then control returns to step 502 to wait for another request.

If the request is to access a hardware or software feature through an API provided by the host agent 230, then control passes from step 522 to step 524. In step 524, the host agent 230 receives a function call that is part of an API that configures, controls, or accesses the requested hardware or software feature, and a session identifier that may indicate that the software application 240, 244 is authorized to make this request. In one embodiment, the function prototype may allow the session identifier to be passed to the host agent 230 as an argument of the function.

Before processing the function request, the host agent 230 may verify certain aspects of the session identification value. In step 526, the host agent may verify that the session identifier has not expired. In one embodiment, a session identifier value may expire after the passage of a predetermined amount of time after it is issued. In another embodiment, a session identifier may expire after it has been used a predetermined number of times to prove an application's authority to access a particular host agent API. If the session identifier is expired, then control passes to step 534, where the request is rejected, and then to step 502, where the host agent waits for another request. In step 534, the host agent 230 may optionally provide a reason, such as a reason code, for rejecting the request.

If the session identifier is not expired, then control passes to step 528, where the authority granted by a currently valid session identifier is verified. Referring briefly to step 516, a session identifier indicates that its holder is authorized to access hardware or software features in the cellular telephone system 200 defined by the MNO 102 and associated with assigned index i. Thus, the software application 240, 244 must not only present a currently valid session identifier, that session identifier must also indicate that the software application 240, 244 has the specific permission required to use that function of the host agent API. For example, the software application 240 may possess a session identifier that permits read-only access to the non-volatile memory 110 through the host agent API. If the software application 240 presents this session identifier in conjunction with a request to write to the non-volatile memory 110, the host agent 230 will reject the request. If the session identifier does not allow access to a function within the host agent API, then control passes to step 534, where the request is rejected, and then to step 502, where the host agent waits for another request. The host agent 230 may optionally provide a reason for rejecting the request in step 534.

If the session identifier indicates that the software application 240, 244 has the requisite privilege to access that function of the host agent API, then control passes to step 530, where the host agent 230 executes the API function call, and returns to step 502, where the host agent 230 waits for another request.

In the text accompanying FIG. 3, it was noted that for a given assigned index i, the MNO 102 may provide an application key AKey[i] to the software application 240, 244, may provide an expected result value Result[i] to the host agent, and may write a SPDO value, SPDO[i], and a SPDO key, HKey[i], so that the following authorization equivalence test will succeed:

$$F(Hkey[i], G^{-1}(AKey[i], SPDO[i])) = Result[i]$$

Figure 6:
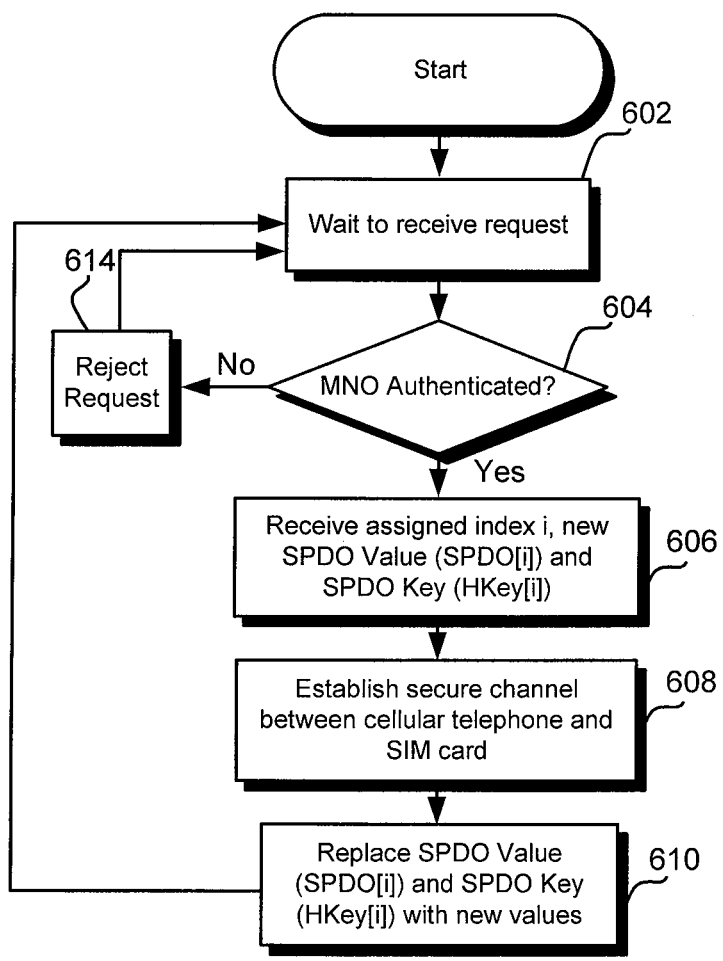
FIG. 6 shows exemplary steps for revoking an authorization of a software application to access a hardware or software feature in a cellular telephone system.

If this equivalence test succeeds, an authorization is provided to the software application assigned to index i to control, configure, or access certain hardware or software features associated with index i. The MNO 102 may revoke an authorization to features associated with index i by changing one or more of the variable values so that the equivalence test fails. The MNO 102 may reinstate an authorization to features associated with index i by changing one or more of the variable values, so that the equivalence test passes. The values of AKey[i] and Result[i] may be compiled into the executable instructions associated with the software application 240, 244 and the host agent 230, respectively. However, the SPDO value, SPDO[i], and the SPDO key, HKey[i] are stored in the SIM card 108, and thus, are more easily changed by the MNO 102. FIG. 6 shows exemplary steps 600 for revoking an authorization of a software application to access a hardware or software feature in a cellular telephone system.

Control begins at step 602, where a request from the MNO 102 is received at the cellular telephone 106. In one embodiment, the request is processed by the host agent 230. In another embodiment, the request from the MNO 102 is processed by another module or component within the operating system (OS) instructions executed by the processor 220 in the cellular telephone 106. In yet another embodiment, an application within SIM card 108 processes the request from the MNO 102. In this embodiment, the MNO 102 may establish a secure, over the air (OTA) connection with the SIM card 108, where the host agent 230 or the host 210 may forward the request from the MNO 102 to the SIM card 108 for execution in step 610. Revoking or restoring a software application's authorization to access a feature may be thought of as a security-sensitive task. If any entity could freely change these values in the SIM card 108, the security of the authentication and authorization system could be compromised. Therefore, the identity of the requesting entity (the MNO 102) may be confirmed before the request is processed. A variety of authentication techniques are possible, such as challenge-response algorithms or verifying that a password received from the MNO 102 corresponds to a MNO-defined password previously stored in the SIM card 108 during manufacturing or configuration of the cellular telephone 106. Similarly, the receipt of the request through a secure wired or wireless communication channel between the MNO 102 and the cellular telephone 106 may also be relied upon to establish the identity of the requester.

In step 604, if the MNO is not authenticated, then the request is rejected in step 614, and control returns to step 602. If the MNO 102 is authenticated, then control passes to step 606, where the new SPDO value SPDO[i], the new SPDO key HKey[i], and the index i is received from the MNO 102. In step 608 a secure channel may be established between the cellular telephone 106 and the SIM card 108. A secure channel may prevent an unauthorized entity from detecting the SPDO[i] and HKey[i] values being written to the SIM card 108, or the command sequence required to perform the write operation. In one embodiment, commands and/or data exchanged between cellular telephone 106 and the SIM card 108 are encrypted before transmission over the interface 212, and decrypted after reception over the interface 212. In one embodiment, an existing secure channel may be used between the cellular telephone 106 and the SIM card 108 instead of creating a new secure channel. In step 610, the existing SPDO value and SPDO key stored in the SIM card 108 and associated with index i are replaced by the new SPDO[i] and HKey[i] values received from a third party, such as the MNO 102. In one embodiment, the replacement is completed by instructing the SIM card 108 to overwrite the values. The instruction may be formed by the host agent 230 in response to the request, or may be an instruction received from the MNO 102 and forwarded to the SIM card 108 by the host 210 or the host agent 230.

In one embodiment, the existing SPDO value and SPDO key stored in the SIM card 108 are replaced by overwriting the SPDO value and SPDO key with the new values. The SIM card may impose other security measures before the write operations can occur, such as accessing a secure account within the card, supplying a password, or completing other command sequences or security algorithms that have the goal of reducing the probability that an unauthorized entity may overwrite the SPDO key or SPDO value contents. Where the third party is the MNO 102, the security measures may be similar to or comprise the same measures that the MNO 102 undertakes to establish a secure communication channel with the cellular telephone 106 when exchanging other types of commands or data. The secure communication channel between the cellular telephone 106 and the SIM card 108 may now be closed, and control returns to step 602 to await another request.

Referring back to FIG. 3, for each of the N assigned index values available in the system 200, the host agent 230 must store or have access to an expected result value, and a host key value. Depending on the value of N, and the size of each expected result Result[i], the results set Result[1:N] may require a substantial amount of storage space, either compiled into the executable instructions of the host agent 230, or stored in the non-volatile memory 250 or other secure storage within the host 210 or processor 220. Further, as the number of software applications 240, 242, 244 increase, a system 200 may require more than N assigned index values to support the authorization schemes implemented by the MNO 102. If the N expected result values are stored within the executable instructions of the host agent 230, then the host agent 230 software or firmware may need to be recompiled and reprogrammed into the executable code storage space of the host 210, in order to include greater than N expected result values. Thus, it may be desirable to eliminate the need for the set of N result values Result[1:N] in the authentication and authorization scheme as shown in FIG. 3.

Figure 7:
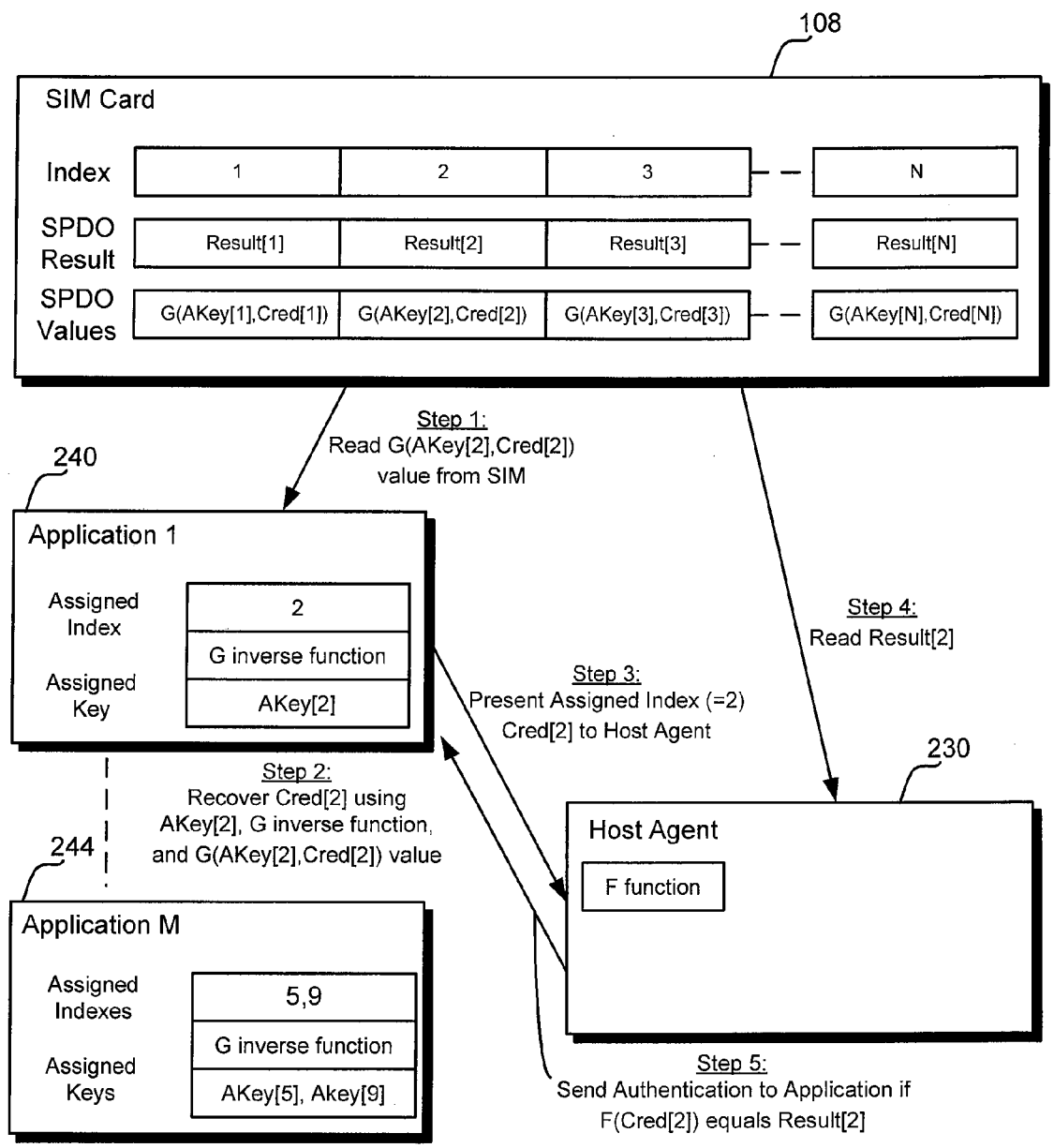
FIG. 7 shows an exemplary flow of data and variables when authenticating and authorizing a software application to access a hardware or software feature in a cellular telephone system.

In the embodiment detailed in FIG. 7, authentication and authorization of a software application 240 may be performed without the use of a set of an expected results stored within the host agent 230. FIG. 7 shows the flow of data and variables when authenticating and authorizing a software application to access a hardware or software feature in a cellular telephone system 200. In comparison to FIG. 3 and Table 1, the MNO 102 provides nearly the same functions and variables that may be used in the authentication and authorization process. From the perspective of the software application 240, 244, the authentication and authorization process appears identical to the procedure presented in FIGS. 3 and 4 and the accompanying description. However, the expected result set Result[i] previously stored in the host agent is now stored within the SIM Card 108 in place of the HKey[i] array, and the HKey[i] is no longer required for the host agent 230 to complete the authentication and authorization process.

Two sets of SIM Protected Data Objects (SPDOs) are stored in the SIM Card 108 by the MNO 102 for use during the authentication and authorization process. The first set is referred to as SPDO values. Each SPDO value (SPDO[i]) is the output of a public function G applied to a corresponding credential (Cred[i]), using a corresponding application key (AKey[i]).

$SPDP[i] = G(AKey[i], Cred[i])$

The function G is any invertible function. For example, if function G inverted each of the bits in a binary representation of a value X, then the inverse function (denoted as $G^{-1}$) would also invert each bit, so that the original value X can be recovered:

$G^{-1}(G(X)) = X$

AKey[i] is an input that is used by invertible function G. In this case, the value X can be recovered from invertible function that accepts an additional input (k) as follows:

$G^{-1}(k, G(k,X)) = X$

In one embodiment, function G is a symmetric-key encryption function such as Advanced Encryption Standard (AES) or Triple Data Encryption Standard (TDES or 3DES), where the application key is used to encrypt the credential. The corresponding inverse of function G (referred to as $G^{-1}$) is a symmetric key decryption function using the same application key, and may be used to recover the credential from the SPDO value SPDO[i] read from the SIM card 108.

$G^{-1}(AKey[i], SPDO[i]) = G^{-1}(AKey[i], G(AKey[i], Cred[i])) = Cred[i]$

The MNO 102 may assign an application index i and a corresponding application key AKey[i] to a software application 240, 244. In one embodiment, the index value i and corresponding application key AKey[i] are only assigned to one software application 240, and may not be re-used for other software applications. For one software application, such as Application 1 in FIG. 7, the MNO assigns index i=2, and an application key AKey[2]. The MNO also provides the inverse of function G (referred to as $G^{-1}$) to the software application 240, 244 for use in recovering the credential. The assigned index value, application key, and inverse of function G may be compiled into the executable instructions of the software application 240.

SPDO expected result values are the second set of SIM Protected Data Objects (SPDOs) stored in the SIM Card 108. The ith SPDO expected result value, Result[i], may be used by the host agent 230 to verify the ith credential presented to it, Cred[i], using the following equation:

$Result[i] = F(Cred[i])$

Thus, the host agent 230 requires the storage space to implement the function F, and the host 210 does not require the storage space to store a host key array HKey[1:N]. The simplified verification process within the host agent may present several security considerations. For example, if the Result[i] array is readable by the software application 230, 244, and F is a public function, it may be possible to calculate the credential to present to the host agent 230 as shown in the equation below:

$F^{-1}(Result[i]) = F^{-1}(F(Cred[i])) = Cred[i]$

In one embodiment, function F is a non-invertible function (also known as an irreversible function or a one-way function), such as the SHA-256 one-way cryptographically secure hash function described in Federal Information Processing Standards Publication 180-2. As an irreversible function, an inverse function $F^{-1}$ may not be determinable, and thus, calculating a credential based on the SPDO expected result value Result[i] may be avoided. In another example, a malicious application may intercept the value of Result[i] being read from the SIM card 108 by the host agent 230, and may replace that value with a value that will satisfy the equivalence test performed by the host agent 230:

$Result[i] = F(Cred[i])$

In another embodiment, the host agent 230 may establish a secure channel between the host agent 230 and the SIM card 108. In one embodiment, commands and data exchanged on a secure channel between the host agent 230 and the SIM card 108 are encrypted before transmission, and are decrypted after reception. A secure channel may prevent an unauthorized entity from intercepting or substituting the Result[i] value being read from SIM card 108 or the command sequence required to perform the read operation of the SPDO key from the SIM Card 108.

Referring to FIG. 7, the software application 240 is authenticated by the host agent and receives an authorization from the host agent 230 in several steps. The software application 240 reads its assigned SPDO value, SPDO[2], from the SIM card 108. In order to do this, the software application 240 may need to present its assigned index to the SIM card 108, and the SPDO value returned corresponds to the assigned index. The assigned SPDO value returned by the SIM card 108, SPDO[2], is the output of function G applied to the credential Cred[2], using application key AKey[2]. The software application 240 then applies the "G inverse" function to SPDO value, using its assigned application key AKey[2] in order to recover its assigned credential Cred[2].

The software application 240 then presents its assigned index value, and the credential Cred[2], to the host agent 230. The host agent 230 reads an SPDO Key from the SIM Card 108. The retrieved SPDO expected result, Result[2], corresponds to the assigned index value i=2 presented by the software application. The host agent 230 then applies function F to the credential, and the output is compared to SPDO expected result Result[2] using the following test:

$$Result[2] = F(Cred[2])$$

If the comparison succeeds, the host agent 230 has authenticated the identity of the software application 240, and provides an authorization, such as a session identifier, to the application 240 to use a software or hardware feature. The software application 240 may provide the session identification value instead of repeating the authorization process outlined above in order to use that software module or feature through an API of the host agent 230. In one embodiment, the session identification value may expire after a period of time, or a number of uses of the host agent 230 API. If the session identification value is expired, the authentication and authorization process may be repeated in order to obtain a new authorization and new session identification value.

For a given index i, the MNO 102 sets values of the credential Cred[i], the application key AKey[i], the expected result Result[i], and the SPDO value SPDO[i] (in other words, G(AKey[i], Cred[i])) so that the following equations are satisfied:

$$Result[i] = F(Cred[i])$$

$$Result[i] = F(G^{-1}(AKey[i], SPDO[i]))$$

$$Result[i] = F(G^{-1}(AKey[i], G(AKey[i], Cred[i])))$$

The values of Result[i] and SPDO[i] are stored by the MNO in the SIM card 108. Inspection of the equations above reveals that the MNO 102 may cause this comparison to fail by changing the value of Result[i], SPDO[i], or both. Thus, the software application 240, 244 assigned to index i will not be authenticated, and will not receive an authorization, if the MNO 102 sets values of Result[i] and SPDO[i] that cause the comparison equations to fail. As previously noted, the MNO 102 may change values of Result[i] and/or SPDO[i] to revoke an authorization (assuming that session identifiers expire after a period of time or a number of API function calls). Further, the MNO 102 may change values of Result[i] and/or SPDO[i] to restore an authorization. For example, if a mobile network subscriber has activated a feature of a cellular telephone 106, the MNO may set values of Result[i] and/or SPDO[i] to allow the authentication and authorization equivalence test to succeed when attempted again.

As previously noted, a rogue application 240 may attempt to circumvent the revocation of an authorization by storing a previously calculated valid credential Cred[i], then presenting this value to the host agent 230 instead of a new credential value periodically recalculated from the SPDO[i] value. For this reason, changing the value of SPDO[i] alone may be a less effective method of revoking an authorization. By changing Result[i] as well, the MNO 102 may prevent an application 240 from merely presenting a previously calculated Cred[i] to renew an authorization after the MNO 102 has revoked privileges to that application 240.

While the authorization and authentication performed by the host agent 230 in FIG. 7 is different than what is described in FIG. 3, the identity of the software application 240 is still authenticated through this process. The software application 240 only has access to application key 2, AKey[2], which may be provided by the MNO 102 to the author of the software application. Another software application may not successfully complete the result comparison equation without the correct value of AKey[2], as evident from the comparison equations.

$$Result[2] = F(Cred[2])$$

$$Result[2] = F(G^{-1}(AKey[2], SPDO[2]))$$

A software application that presents the correct credential Cred[2] must also be the software application that is assigned (or has knowledge of) the corresponding application key AKey[2] and index i=2 by the MNO. Thus, the process may also be utilized to authenticate the identity of the software application 240.

As previously noted, from the perspective of the software application 240, 244, an embodiment that eliminates the need for an expected results array Result[1:N] in the authentication process appears identical to the procedure presented in FIGS. 3 and 4 and the accompanying description. However, from the perspective of the host agent 230, there are some changes to the steps for authenticating and authorizing a software application to access a software or hardware feature through the host agent API.

Figure 8:
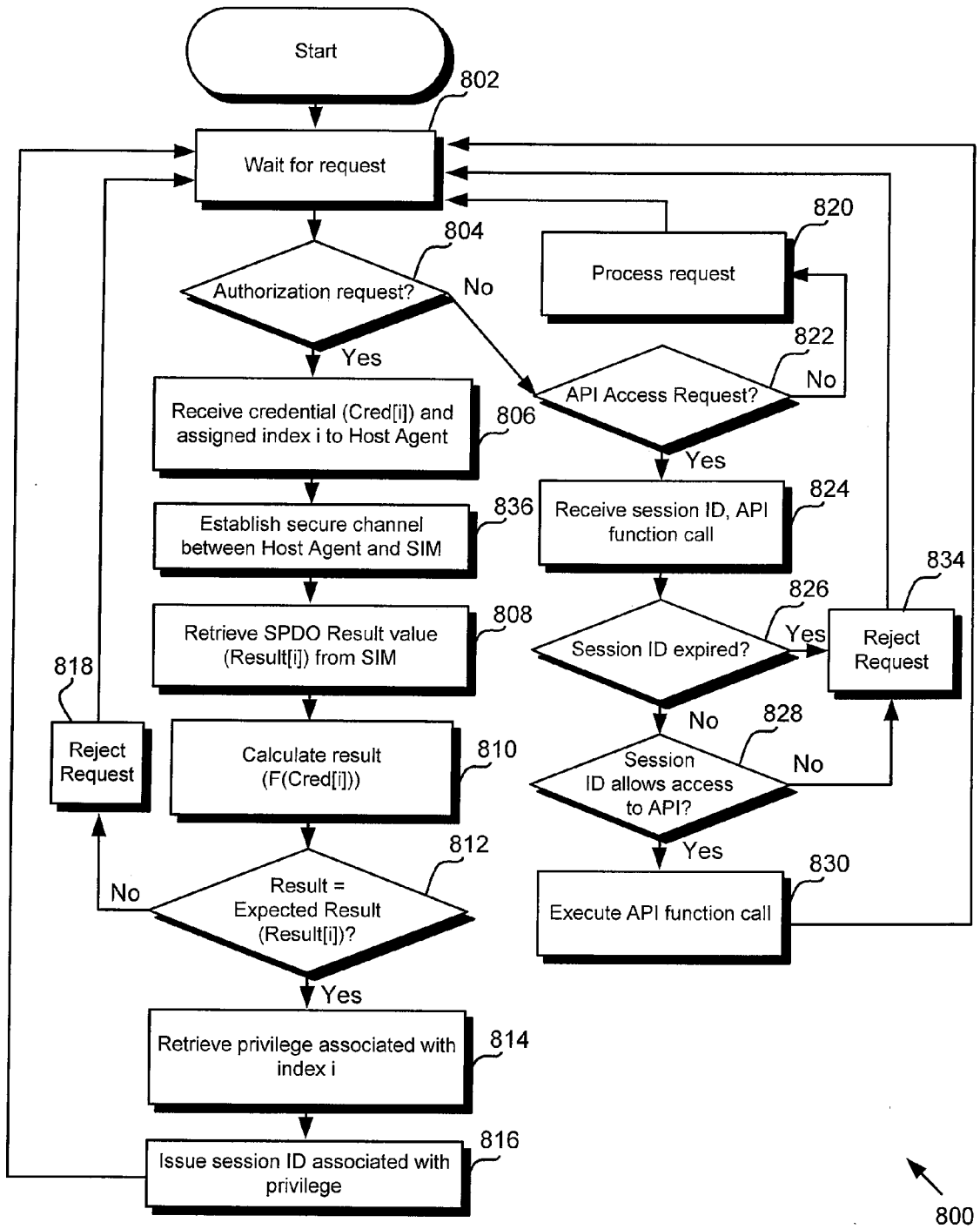
FIG. 8 shows exemplary steps for authenticating and authorizing a software application to access a hardware or software feature in a cellular telephone system.

FIG. 8 shows exemplary steps 800 for authenticating and authorizing a software application to access a hardware or software feature in a cellular telephone system 200. The exemplary steps 800 are from the perspective of the host agent 230 that processes a request by the software application 240, 244 to access a hardware or software feature in a cellular telephone system 200. Control begins at step 802, where the host agent 230 receives a request from a software application 240, 244. In one embodiment, an entity such as a software application may request to be authenticated and authorized to access a hardware or software feature in a cellular telephone system 200. An entity may also request access to a hardware or software feature through an API provided by the host agent 230. In step 804, the host agent determines the type of request that was received.

If a software application 240, 244 requests authorization to access a host agent 230 API for a particular function, control passes from step 804 to step 806. In step 806, the host agent 230 receives a credential, and the assigned index i associated with the requested hardware or software feature. Control passes to step 836, where a secure channel is established between the host agent 230 and the SIM card 108. A secure channel may prevent an unauthorized entity from detecting or intercepting the Result[i] value retrieved from the SIM card 108, or the command sequence required to perform the read operation. In one embodiment, commands and/or data exchanged between host agent 230 and the SIM card 108 are encrypted before transmission over the interface 212, and decrypted after reception over the interface 212.

Once a secure channel is established, control passes to step 808, where the host agent 230 reads the SPDO expected result value associated with assigned index i, Result[i], from the SIM card 108. In step 810, the host agent 230 applies function F to the credential Cred[i]. In one embodiment, the function F is a non-invertible or irreversible one-way function, such as the SHA-256 cryptographically secure hash function. Control passes to step 812, where the result of applying function F to the credential Cred[i], F(Cred[i]), is compared with the expected result associated with the assigned index, Result[i].

If the comparison fails, then the authentication and authorization attempt is unsuccessful, the request is rejected in step 818, and control returns to step 802 to wait for another request. The host agent may optionally communicate the reason for the rejection to the software application 240, 244 in step 818. If the comparison succeeds, then the host agent 230 determines the hardware or software access privileges associated with assigned index i in step 814. Control passes to step 816, where these privileges are associated with a session identifier value issued to the software application 240, 244.

By providing a session identifier, the host agent 230 indicates to the software application 240, 244, that its identity has been authenticated, and it is authorized to access hardware or software features in the cellular telephone system defined by the MNO 102 and associated with assigned index i. The software application may utilize the issued session identifier value in subsequent requests to use a host agent API to access a hardware or software feature permitted by that privilege.

As stated above, the host agent 230 may receive authentication and authorization requests, and may also receive requests to use an authorization to access a host agent API. Returning to step 804, if the request is not an authentication and authorization request, then control passes to step 822, where the host agent 230 determines if the host agent 230 has received a request access to a hardware or software feature through an API provided by the host agent 230. If not, some other type of request has been received, control passes to step 820, where the host agent 230 processes the request, and then control returns to step 802 to wait for another request.

If the request is to a hardware or software feature through an API provided by the host agent 230, then control passes from step 822 to step 824. In step 824, the host agent 230 receives a function call that is part of an API that configures, controls, or accesses the requested hardware or software feature, and a session identifier that may indicate that the software application 240, 244 is authorized to make this request. In one embodiment, the function prototype may allow the session identifier to be passed to the host agent as an argument of the function.

Before processing the function request, the host agent 230 may verify certain aspects the session identification value. In step 826, the host agent may verify that the session identifier has not expired. In one embodiment, a session identifier value may expire after the passage of a predetermined amount of time after it is issued. In another embodiment, a session identifier may expire after it has been used a predetermined number of times to prove an application's authority to access a particular host agent API. If the session identifier is expired, then control passes to step 834, where the request is rejected, and then to step 802, where the host agent waits for another request. In step 834, the host agent 230 may optionally provide a reason for rejecting the request.

If the session identifier is not expired, then control passes to step 828, where the authority granted by a currently valid session identifier is verified. The software application 240, 244 must not only present a currently valid session identifier, that session identifier must also indicate that the software application 240, 244 has the specific permission required to use that function of the host agent API. If the session identifier does not allow access to a function within the host agent API, then control passes to step 834, where the request is rejected, and then to step 802, where the host agent 230 waits for another request. The host agent 230 may optionally provide a reason for rejecting the request in step 834.

If the session identifier indicates that the software application 240, 244 has the requisite privilege to access that function of the host agent API, then control passes to step 830, where the host agent 230 executes the API function call, and returns to step 802, where the host agent 230 waits for another request.

Thus, a mobile network operator 102 may restrict access to certain hardware and software features of a cellular telephone system 200. These restricted features may be accessible through a host agent 230 API to authenticated and authorized entities. An entity, such as a software application 240, 242, 244, may be assigned an access key and variables used to calculate a credential. The MNO 102 may assign the host agent 230 corresponding values to verify the calculated credential. Further, an authorization by the host agent 230 may expire after a period of time or a number of uses, thus requiring periodic authentication and authorization in order to continue accessing a restricted hardware or software feature of the system 200. The success of the authorization and authentication process depends on assigned values stored in a SIM or RUIM card 108 that are easily changeable by the MNO 102.

Thus, depending on the assigned values the MNO 102 stores in the SIM card 108, the MNO 102 may easily enable or disable an authorization to a feature. For example, an MNO may allow a successful authentication and authorization when a mobile network subscriber has paid the MNO 102 an additional monthly fee to access a feature, such as a program to take digital pictures with the camera module 280 of the cellular telephone, or storing music and other files to a removable media card 110. Similarly, the MNO 102 may revoke an authorization to a feature, such as when a subscriber cancels a feature from a cellular telephone subscription plan.

The MNO 102 may also allow the development of third party applications, while retaining the ultimate control over whether a software application is capable of operating on the system 200 or accessing sensitive hardware or software resources. An MNO 102 may assign an index value and an application key to a software application 240, 242, 244 to allow access to selected features through the host agent 230 API. In one embodiment, the MNO may make this assignment only when it verifies that the software can be trusted (for example, not a virus or another type of malicious application). If the MNO 102 later finds that the application has undesirable characteristics, the MNO 102 may disable its use by network subscribers simply by revoking its privileges to access the host agent 230 API, thereby crippling or entirely disabling the ability of the application to function or harm hardware or software elements of the system 200.

An MNO 102 may also create permission levels by establishing or revoking different degrees of privilege to access a resource. For example, as shown in Table 2, by using two or more assigned indexes and their corresponding key resources, the MNO 102 may allow read, read/write, or read/write/erase privileges to a non-volatile memory 110. This flexibility may allow an MNO 102 to adjust the permissions to access a particular resource in response to a variety of conditions. For example, a trusted software application or user may initially have full privileges to access the content in a non-volatile memory 110. If the MNO 102 detects a security threat or another condition, the MNO 102 may reduce the access privilege to the non-volatile memory 110 for the trusted application to read-only access.

Referring back to FIG. 3, the function G may be a public function shared among the applications 240, 242, 244. Similarly, the integrity of the system may not necessarily depend on the keeping the function F (used by the host agent 230) a secret. Each application 240, 242, 244, is responsible for protecting their assigned application key or keys. Similarly, the host agent 230 may take measures to protect the expected results set Result[1:N]. In some embodiments, the need for expected results set may be eliminated. Possible security consideration in this embodiment may be addressed by providing an irreversible function F, to avoid calculating a credential based on the SPDO Key. In other embodiments, security may also be enhanced by the use of secure channels when reading or storing SPDO values or keys in the SIM card or RUIM card.

The advantages and features of the embodiments may also be achieved in other systems under centralized control, and are not limited to cellular telephones in communication with a mobile network operator. For example, instead of a cellular telephone 106, a personal computer in communication with a server over a wired or wireless connection, may authorize software applications or users to access selected features of the personal computer system, where the success of an entity's authentication or authorization attempt is similarly dependent on variables under centralized control by the server.

Although the invention has been described with respect to various system and method embodiments, it will be understood that the invention is entitled to protection within the full scope of the appended claims.

The invention claimed is:

1. A method of managing host application privileges to a hardware or software feature provided by a host, comprising:
   receiving at a host agent an authorization request from a host application, wherein the authorization request comprises a credential and an index value, and wherein the index value is associated with the hardware or software feature;
   the host agent, in response to the authorization request, obtaining credential validation data from a storage location in a non-volatile storage device corresponding to the index value;
   determining at the host agent if the credential is valid based on the credential validation data;
   transmitting an authorization from the host agent to the host application if the credential is valid, wherein the authorization comprises a session identification value;
   receiving at the host agent a request to access the hardware or software feature, wherein the request comprises the session identification value;
   the host agent granting the request if the session identification value is currently associated with a minimum permission required to access the hardware or software feature requested;
   receiving an instruction at the host agent from a third party to replace the credential validation data stored in the non-volatile storage device with invalid credential validation data that prevents the host application from calculating a valid credential such that future authorization requests by the host application using the credential to access the hardware or software feature will be denied; and
   the host agent instructing the non-volatile storage device to replace the credential validation data stored in the non-volatile storage device with the invalid credential validation data.

2. The method of claim 1, further comprising:
   subsequent to instructing the non-volatile storage device to replace the credential validation data, receiving a second authorization request at the host agent from the host application, wherein the second authorization request comprises the credential and the index value;
   the host agent obtaining the invalid credential validation data from the storage location in the non-volatile storage device corresponding to the index value;
   determining by the host agent if the credential is valid based on the invalid credential validation data; and
   transmitting a denial from the host agent to the host application if the credential is not valid.

3. The method of claim 1, wherein the credential validation data comprises a host key, and determining by the host agent if the credential is valid based on the credential validation data comprises:
   the host agent applying a function to the credential to yield a transformed credential, wherein the function utilizes the host key; and
   determining by the host agent if the transformed credential is equal to an expected value.

4. The method of claim 2, wherein the invalid credential validation data comprises an invalid host key, and wherein determining by the host agent if the credential is valid based on the invalid credential validation data comprises:
   the host agent applying a function to the credential to yield a transformed credential, wherein the function utilizes the invalid host key; and
   determining by the host agent if the transformed credential is equal to an expected value.

5. The method of claim 1, wherein the credential validation data comprises an expected value, and wherein determining by the host agent if the credential is valid based on the credential validation data comprises:
   the host agent applying a non-invertible function to the credential to yield a transformed credential; and
   determining by the host agent if the transformed credential is equal to the expected value.

6. The method of claim 2, wherein the invalid credential validation data comprises an invalid expected value, and wherein determining by the host agent if the credential is valid based on the invalid credential validation data comprises:
   the host agent applying a non-invertible function to the credential to yield a transformed credential; and
   determining by the host agent if the transformed credential is equal to the invalid expected value.

7. The method of claim 1, further comprising incrementing by the host agent a count value indicative of a number of access requests received, wherein the session identification value is not currently associated with a minimum permission if the count value exceeds a predetermined value.

8. The method of claim 1, wherein the session identification value is not currently associated with a minimum permission if a predetermined period of time has elapsed between transmitting the authorization and receiving the request to access the hardware or software feature.

9. The method of claim 1, wherein authorization of the host application to access the hardware or software feature provided by the host comprises a tiered authorization and further comprises:
   receiving at the host agent a second authorization request from the host application, wherein the second authorization request comprises a second credential and a second index value, and wherein the second index value is associated with the hardware or software feature;
   the host agent, in response to the authorization request, obtaining a second credential validation data corresponding to the second index value from the non-volatile storage device;
   determining at the host agent if the second credential is valid based on the second credential validation data; and
   transmitting one of a plurality of authorizations from the host agent to the host application based on the first credential and the second credential if at least one of the first credential and the second credential are valid.

10. The method of claim 9, wherein transmitting one of a plurality of authorizations from the host agent to the host application comprises:
    transmitting a first authorization from the host agent to the host application if a second transformed credential is equal to a second expected value and a transformed credential is equal to an expected value;

transmitting a second authorization from the host agent to the host application if the second transformed credential is not equal to the second expected value and the transformed credential is equal to the expected value; and transmitting a third authorization from the host agent to the host application if the second transformed credential is equal to the second expected value and the transformed credential is not equal to the expected value, wherein the first, second, and third authorizations are associated with different permissions to access the hardware or software feature.

11. The method of claim 1, wherein the non-volatile storage device is a Subscriber Identity Module card.

12. The method of claim 1, wherein the non-volatile storage device is a Re-Usable Identification Module card.

13. A method for managing host application privileges to a hardware or software feature provided by a host, comprising:

receiving at a non-volatile storage device an instruction from a third party to store an encrypted valid credential in a storage location in the non-volatile storage device corresponding to an index, the instruction comprising the encrypted valid credential and the index, wherein the index is associated with a hardware or software feature provided by a host;

storing the encrypted valid credential in the storage location in the non-volatile storage device corresponding to the index, wherein the storing enables a host application to access the hardware or software feature associated with the index;

receiving from the host application a request to read the storage location associated with the index;

returning the encrypted valid credential to the host application in response to the request, wherein returning the encrypted valid credential permits the host application to calculate a valid credential by decrypting the encrypted valid credential and receive from a host agent an authorization to access the hardware or software feature after presenting the valid credential and the index to the host agent;

receiving at the non-volatile storage device an additional instruction from the third party to replace the encrypted valid credential with an encrypted invalid credential, wherein the non-volatile storage device is configured to return the encrypted invalid credential in response to a subsequent request from the host application to read the storage location, thereby preventing the host application from calculating a valid credential such that future authorization requests by the host application using the encrypted invalid credential to access the hardware or software feature associated with the index will be denied, the instruction comprising the encrypted invalid credential; and the non-volatile storage device replacing the encrypted valid credential in the storage location corresponding to the index with the encrypted invalid credential, wherein an encrypted additional valid credential stored in the non-volatile storage device is associated with the hardware or software feature, and an availability of the encrypted valid credential and the encrypted additional valid credential to the host application at least partially defines a permission level of the host application to access the hardware and software feature.

14. The method of claim 13, wherein the permission level comprises at least one of a read permission, a write permission, and an erase permission.

15. The method of claim 13, wherein the non-volatile storage device is a Subscriber Identity Module card.

16. The method of claim 13, wherein the non-volatile storage device is a Re-Usable Identification Module card.

17. The method of claim 13, wherein the third party is a Mobile Network Operator.

18. A host device comprising:

an input/output port configured to place the host device in communication with a non-volatile storage device, comprising a storage location associated with an index value;

a memory storing processor executable instructions; and a processor configured to communicate with the input/output port and configured to execute the processor executable instructions stored in the memory and to act as a host agent to:

receive an authorization request from a host application, wherein the authorization request comprises a credential and the index value, and wherein the index value is associated with the hardware or software feature;

obtain credential validation data from the storage location in the non-volatile storage device corresponding to the index value;

determine if the credential is valid based on the credential validation data;

transmit an authorization from the host agent to the host application if the credential is a valid credential, wherein the authorization further comprises a session identification value;

receive a request to access the hardware or software feature, wherein the request comprises the session identification value;

grant the request if the session identification value is currently associated with a minimum permission required to access the hardware or software feature requested;

receive from a third party an instruction to replace the credential validation data stored in the non-volatile storage device, the instruction comprising an invalid credential validation data that prevents the host application from calculating a valid credential such that future authorization requests by the host application using the credential to access the hardware or software feature will be denied; and instruct the non-volatile storage device to replace the credential validation data stored in the non-volatile storage device with the invalid credential validation data.

19. The host device of claim 18, wherein the credential validation data comprises a host key, and determining if the credential is valid based on the credential validation data comprises:

applying by the host agent a function to the credential to yield a transformed credential, wherein the function utilizes the host key; and determining at the host agent if the transformed credential is equal to an expected value.

20. The host device of claim 18, wherein the credential validation data comprises an expected value, and determining if the credential is valid based on the credential validation data comprises:

applying by the host agent a non-invertible function to the credential to yield a transformed credential; and determining at the host agent if the transformed credential is equal to the expected value.

* * * * *